United States Patent [19]
Kratzer

[11] 3,865,568
[45] Feb. 11, 1975

[54] METHOD FOR FABRICATING A NATURAL FERTILIZER

[76] Inventor: Beat Kratzer, Hauptstrasse 91, Diessenhofen, Switzerland

[22] Filed: Sept. 19, 1973

[21] Appl. No.: 398,803

[30] Foreign Application Priority Data
Sept. 26, 1972 Austria .............................. 8286/72

[52] U.S. Cl. .............................. 71/21, 55/68, 55/73, 210/45, 210/49
[51] Int. Cl. .............................................. C05f 3/00
[58] Field of Search ............ 71/8, 9, 21; 210/42, 49, 210/45; 55/68, 73

[56] References Cited
UNITED STATES PATENTS
3,108,868 10/1963 Wade ....................................... 71/21
3,732,089 5/1973 Megronigle ................................ 71/8

Primary Examiner—Charles N. Hart
Assistant Examiner—Richard Barnes
Attorney, Agent, or Firm—Eric H. Waters

[57] ABSTRACT

A method of and apparatus for the production of a natural fertilizer, especially a liquid fertilizer, by treating aqueous mixtures of animal secretions with mineral acids and, if desired, neutralizing the excess acid, wherein:

1. the animal secretions, if desired after preparation with water, have the pH-value adjusted so as to be in a range of 0.1 to 2, preferably approximately 1, by means of mineral acids and such pH-value is maintained constant and the mixture is thereafter agitated or stirred for 24 to 60 hours, preferably about 48 hours;

2. the obtained liquid phase of the undissolved solids is separated; and 3. the pH of the liquid freed of solids obtained by step (2) is adjusted to a value of at least 5 by the addition of a basic substance; and 4. after termination of the neutralization the eventually obtained precipitation is separated-out.

25 Claims, 1 Drawing Figure

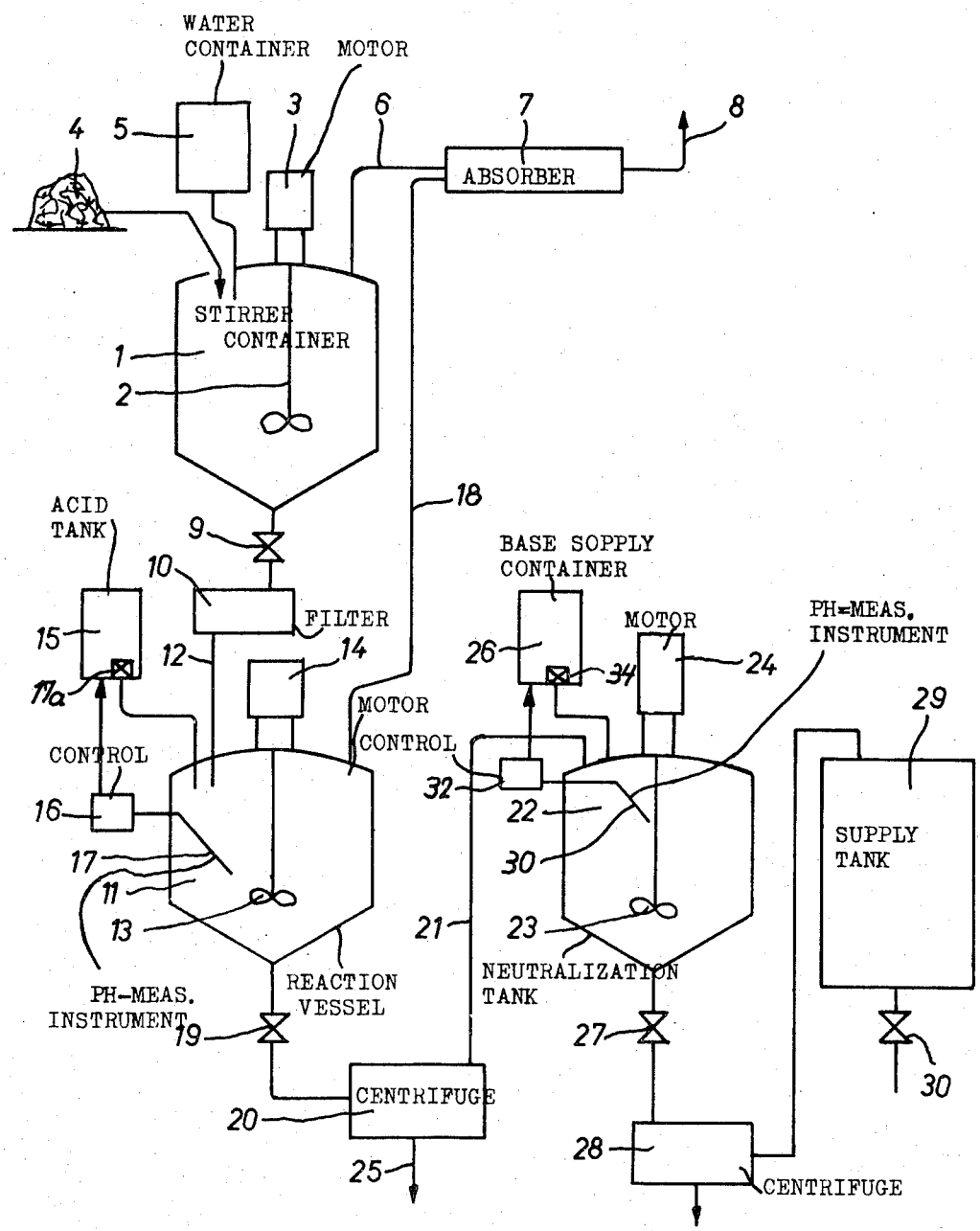

METHOD FOR FABRICATING A NATURAL FERTILIZER

BACKGROUND OF THE INVENTION

The present invention relates to a new and improved method for the production of a natural fertilizer, especially a liquid fertilizer or manure, from animal secretions and to an apparatus for the performance of the aforesaid method.

Nutrients are removed in substantial amounts from cultivated land owing to annually repeated crops. Depending upon the nature of the earth and the type of plants being grown the earth becomes poorer in one or the other nutrient material. Upon extensive depletion of the earth the deficiency can entail a number or all of the nutrients. The crop yield can vary quite extensively as a function thereof. The need for a number of decades to increase the crop yield of land used for agricultural purposes has led to fertilizing, i.e., attempts have been made to put back into the ground, by employing suitable measures, the nutrients which have been removed and in many cases even with a depot formation through the use of an excess of nutrients in order to provoke an increase in the crop yield. In this regard there are available two techniques, to wit, firstly fertilization with suitable inorganic substances or mixtures of substances, and secondly fertilization with fertilizers which are inherently economical.

Fertilization with inorganic substances or substance mixtures has found widespread acceptance today and has reached enormous proportions:

Consumption of fertilizer hectars 1969/70 (FAO Bulletin)

| Country | Production | Consumption |
|---|---|---|
| Europe | 25,630,000 tons | 23,390,000 tons |
| U.S.S.R. | 9,820,000 tons | 8,040,000 tons |
| North and Central America | 20,010,000 tons | 16,580,000 tons |
| Asia | 5,790,000 tons | 7,320,000 tons |

As the primary advantages of this fertilizing technique there can be enumerated the following:
a. really exactly definable composition;
b. selection of the qualitative and quantitative composition in accordance with the requirements of the material to be grown or cultivated;
c. rapid resorption of the inorganic, readily water soluble components from the ground;
d. as a general rule technologically simple production techniques;
e. good transport- and storage capabilities owing to the use of highly concentrated solutions or salts or salt mixtures respectively.

As the primary drawbacks there are to be mentioned:
a. relatively poor retention in the ground and thus under circumstances considerable losses in fertilizer and washing-out owing to heavy contamination of the surface water (phosphates);
b. salt fertilizers hardly contribute to the formation of humus, resulting in the fact that cultivated ground, notwithstanding sufficient fertilization, tends to give a poor yield after a period of time.

In contrast thereto there is the fertilization with fertilizers which are inherently economical. Some of the most economical fertilizers are: animal dung from the stall, liquid manure, straw, compost, feces. In other words materials which can be readily obtained primarily during farming, or which are present as waste materials (feces). The decisive significance of fertilizers which are inherently economical resides in their content of organic substances, particularly having a favorable action upon the structure of the ground or earth and due to the gradual mineralization possess a lasting effect.

Apart from the actual fertilizing effect there is particularly of significance for fertilizers which are inherently economical their properties as concerns improving the ground or earth. The high proportion of organic substances causes a pronounced biological activity in the earth, contributing decisively to the formation of humus. The sorption capability of the humus colloid insures for a high retention capability for water and nutrients. Animal secretions are present in considerable quantities in all agricultural and husbandry operations. Although in the first-mentioned situation there is possible a sensible utilization of the animal secretions as fertilizer, the effective utilization thereof in highly specialized husbandry operations is however associated with considerable difficulties. First of all, there is absent the required cultural land for the recovery of such secretions, furthermore — owing to the constructional characteristics of the stalls — liquid constituents directly reach the sewage network or open waters and considerably load the same.

Fertilizers which are inherently economical, such as stall dung and liquid manure, present in considerable quantities as a waste material during the agricultural raising of cattle and poultry, only can be used to a limited extent in non-agricultural operations, notwithstanding their advantages. In particular, aesthetic considerations (smell, appearance) and hygienic considerations (decaying bacteria, parasites and their eggs) make it impossible to employ the same in the household or garden. Apart from a few exceptions, fertilizers intended for non-agricultural purposes therefore usually are mixtures or solutions of mineral salts.

Previous attempts at providing a natural, biological fertilizer have resulted in simple dry products, which after being strewn over the ground and watering are associated with all of the drawbacks of the starting product.

SUMMARY OF THE INVENTION

Hence, it is a primary object of the present invention to produce from animal secretions a natural fertilizer, especially a liquid fertilizer or manure, which does not possess the aforementioned drawbacks and can be particularly employed in the house and in the garden, of course also in gardening work and agriculture.

The new and improved product of this development should satisfy the following requirements:

1. Smell:

Fertilizers which are inherently economical, such as stall dung and liquid manure, possess an entire spectrum of unpleasant smells, based upon the content of ammonia, hydrogen sulfide, indole, skatole and so forth. These properties are only disturbing to a limited extent when used in open terrain, however such property makes it impossible to use the same in the household or in densely populated areas.

2. Appearance:

Although the appearance of a fertilizer does not constitute any graduator for the quality thereof, in practice such plays an ever increasing importance.

3. Storability:

If animal secretions are stored at normal temperatures without any special pre-treatment, then under the influence of extensively present micro-organisms and enzymes there occur fermentative transformations- and decomposition processes, which generally can be designated as rotting. These processes, even though on the one hand desirable, on the other hand bring about a continuous change in the chemical synthesis or structure of the individual constituents and therefore also the formation of undesired reaction products. It is natural that under the previously mentioned conditions storage in closed containers, while maintaining the qualitative and quantitative composition, becomes problematic. For commercial products, which are not used in agricultural operations, there must be however insured constant composition, at least within acceptable ranges; a requirement, which particularly when using animal secretions as the starting product, only can be satisfied with difficulty.

4. Natural product:

Fertilizers formed on the basis of mineral substances are often designated as synthetic fertilizers, by means of which there can be expressed the difference between natural —oftentimes also called biological — fertilizers. The finding that mineral fertilizers do indeed produce the desired yield over a certain time span, but for a greater period of time the desired quality of the ground can be only insured with simultaneous fertilization with fertilizers which are inherently economical, provides a clear indication of the importance of such natural fertilizers. The desire and need for a natural, ground-improving fertilizer is not only present in agriculture, but also for hobby gardeners and horticulturalists. This desire only can be satisfied by a product which fulfills the requirements enumerated under paragraphs 1, 2 and 3 above.

5. Dosing Possibility:

Fertilizers which are inherently economical hardly can be dosed to the desired degree in the form as such are employed in agriculture, without using special apparatuses for such purposes, i.e. the solid-liquid mixture must be distributed with suitable devices over the cultivated land. The same is also true for fertilizers applied in the form of salts or granulates. Especially when employing wide strewing techniques there result, in this instance, large differences in the strewing density of the granulate and therefore the fertilizing action. Depending upon the condition of the ground, it is not possible to avoid dosing inaccuracies even when employing automatic strewing techniques. Although such problem is of lesser importance in connection with small surface cultures (for instance garden beds), it is still nonetheless not without significance.

The simplest possibility of offering a sufficiently accurate dosing is to thus provide a liquid fertilizer which can be poured in a concentrated or diluted form or sprayed.

6. Hygienic Requirements:

Fertilizers which are inherently economical always contain greater or smaller quantities of parasites. These are not only aesthetically disturbing, rather can also disadvantageously influence the longevity and composition of the fertilizer, or can damage the culture ground and the cultivated plants.

In order to obtain a hygienically faultless product, it is therefore necessary to kill existing parasites and their eggs by suitable measures, and thereafter to separate such from the liquid constituent.

The process for the production of natural fertilizers should be technically simple and not require any expensive, complicated production equipment. It should be reproducible and easily accommodatable to special requirements and starting materials as well as inexpensive to carry out.

These requirements are satisfied by the method aspects of this development.

Now in order to implement these and still further objects of the invention, which will become more readily apparent as the description proceeds, the invention proposes a method for the production of a natural fertilizer, especially a liquid fertilizer, by treating aqueous mixtures of animal secretions with mineral acids and, if desired, neutralizing the excess acid, and is manifested by the features that:

1. the animal secretions, if desired after preparation with water, have the pH-value adjusted so as to be in a range of 0.1 to 2, preferably approximately 1, by means of mineral acids and such pH-value is maintained constant and the mixture is thereafter agitated or stirred for 24 to 60 hours, preferably about 48 hours;
2. the obtained liquid phase of the undissolved solids is separated; and
3. the pH of the liquid freed of solids obtained by step (2) is adjusted to a value of at least 5 by the addition of a basic substance; and
4. after termination of the neutralization the eventually obtained precipitation is separated-out.

The animal secretions which serve as the starting substances are preferably poultry dung, especially chicken dung available in exceedingly great quantities in poultry farms and egg producing installations. Such dung or manure is particularly suitable by virtue of its relatively high, balanced-out content values. There can be, however, also employed all other animal secretions, such as horse dung, cow dung, sheep dung and pig dung as well as the corresponding liquid manures, all of the aforementioned secretions can be used per se or in mixture. The momentary selection of the starting substances is especially dependent upon the content of organic substance and the elements N (nitrogen), P (phosphorus), and K (potassium), whereby in particular also an exceptional quantitative relationship of these three elements is of significance.

A physiological plant discovery which deserves attention and which proves that for good flourishing or growth of cultural plants there are not only necessary structural- and nutrient substances, rather also growth substances. These substances known as auxin are present in the urine and excrements of the abovementioned animals.

When carrying out the inventive method there is generally initially produced an aqueous mixture of the animal secretions. This is regulated preferably in such a manner that it contains approximately 70 to 80% by weight water; for instance there is stirred excrement, which contains 50 to 60% by weight water, with the same quantity of water, whereby this preparation water can be partially or completely replaced by a liquid manure. The preparation with water is generally undertaken in a closed mixing tank; after a duration of 2 to 12 hours, preferably 5 to 6 hours, this preparation phase can be terminated. The waste gases occurring during preparation are conducted through an absorption vessel or tank charged with alkali, such as caustic alkali, caustic soda, caustic lime and so forth, in solid form, on carriers or as a solution or dispersion or with an organic base, for instance diethanolamine solution, and expelled into the surroundings. The preparation is generally underaken at normal or standard pressures and room temperature. For the purpose of reducing the agitation or stirring time it can be of advantage to sometimes employ elevated temperatures, for instance in the range of 25° to 35°C.

After preparation there is begun with the first stage of the method. It is initiated by the addition of a mineral acid to the aqueous mixture. The acid possesses solubilizing, neutralizing and extracting functions. Generally, there is added so much acid to the mixture that there is obtained a pH-value in the order of 0.1 to 2, preferably in the order of about 1, and such value is then maintained constant by carrying out pH-measurements and through the addition of further acid. Suitable as the acids are, for instance, in particular nitric acid, phosphoric acid and especially preferred sulfuric acid as well as mixtures of these acids. These acids are generally employed in commerially available purity and concentration. The solubilization phase (first stage) takes place at a temperature of 15° to 25°C, generally between 24 and 60 hours, preferably for about 48 hours. There is usually employed standard pressures, and the produced acidic gases, just as was the case for the preparation phase, are bound at an absorber having an alkaline charge and the remainder is conducted into the atmosphere. During the addition of the acid and during the entire first process stage the mixture is agitated or stirred.

In order to maintain the discoloration of the liquid in this process stage small, and which occurs owing to the action of the acid and in order to obtain as clear as possible liquid free of solids, it is recommended to filter, centrifuge, or sieve the sludge or slurry of the starting products delivered to the reaction vessel.

If in the first stage there is applied a slight vacuum then nocuous or unpleasant smelling gases can be expelled more easily. It is however also possible to express through the composition a gas, for instance air or to suck such therethrough, which incidentially is also an advantageous measure which can be employed during the preparation phase.

During the acid treatment there is produced a precipitate, particularly when using sulfuric acid or phosphoric acid. During transfer of the treated liquid this is separated-out, which can be realized most easily by centrifuging. The centrifuge residue is washed and can be dried and composted, since it is capable of forming humus; in the dehydrated state it only has a fraction of its starting volume, something which is favorable from the standpoint of protecting the environment.

During the third stage of the method the acid in the treated and clarified mixture is neutralized, either completely or for the most part. The final product for biological reasons must possess a pH-value of at least s, preferably 5.8 to 6.2. For this purpose there is added to the liquid a base. Suitable as the base are ammonia, sodium- and potassium hydroxide or carbonates and in particular calcium oxide, calcium carbonate and calcium hydroxide. For special requirements there also can be adjusted a different pH-value, for instance in the neutral range or in the slightly alkaline range.

The addition of the base should be undertaken slowly so that the pH-value only slowly changes and the reactions can proceed completely. Possibly formed precipitates, for instance calcium sulfate resulting from a sulfuric acid-containing solubilizing liquid, are then present in a compact form which can be readily filtered and only contain slight amounts of included nutrients. Generally, the base is added during the course of about 12 hours. Normally there is used room temperature. When using calcium hydroxide or calcium carbonate this base is preferably added in the form of an aqueous slurry or sludge, the water content of which is to be drained during the preceding stages of the method.

Thereafter, the formed precipitate is separated, for instance by centrifuging, and briefly washed. The clear, liquid phase constitutes the directly usable final product. As a general rule it possesses a solid content (nutrient content) of 4% by weight and contains trace elements which originate from the starting material.

The final product produced according to the method can be considered as natural inasmuch as the substances contained therein emanate from the animal metabolism and during production there are not introduced into the system any chemical compounds which were not already present therein. When using $H_2SO_4$ as the solubilizing and extraction agent and calcium salts for neutralization there are practically quantitatively eliminated from the final product sulfate- and calcium ions.

By virtue of the extraction there are obtained from the precipitates all water soluble substances. The use of acidic extraction agents improves the solubility of difficult to dissolve compounds. Furthermore, protein-like substances are partially hydrolyzed and thus transformed into substances which are more readily water soluble. After their yield these substances can be more rapidly decomposed by the micro-organisms in the ground, so that they are more rapidly available for the plants.

The product produced according to the method aspects of this development is storable. Storage tests over a number of months have shown that there does not occur any deleterious changes in the product.

BRIEF DESCRIPTION OF THE DRAWING

The invention will be better understood and objects other than those set forth above, will become apparent when consideration is given to the following detailed description thereof. Such description makes reference to the annexed drawing wherein the single FIGURE of the drawing schematically illustrates an exemplary embodiment of apparatus suitable for the practice of the inventive method.

DETAILED DESCRIPTION OF THE PREFERRED EMBODIMENTS

Describing now the drawing, the stirrer or agitator container 1 serves for the preparation of the starting product, for instance poultry dung, with water. It comprises a stirrer or agitator 2 which is driven by a suitable drive motor 3. The stirrer container 1 is charged with dung or manure 4 as well as water from the container 5. A vent conduit or line 6 leads to an absorber 7 filled with an alkaline absorption agent; the conduit 8 extends upwardly. The container 1 can be equipped with a heating device and a gas infeed pipe or conduit.

A valve 9 serves for removing and infeeding the sludge or slurry into the acidic reaction vessel 11 via the filter or sieve 10. The containers 1 and 11 can be located adjacent one another; in such case there is provided a pump at the transfer conduit 12. The reaction vessel 11 is equipped with a stirrer or agitator 13 and a stirrer drive motor 14. Acid can be dosed-in via the acid tank 15. The pH-measuring device or instrument 17 serves to control the pH, this pH-measuring instrument regulating the infeed of the acid via the regulation or control unit 16 which for instance controls a dosing valve 17a. The vent conduit or line 18 leads to the absorber 7 or to a second non-illustrated separate absorber.

The solubilized brew emanating from the vessel 11 arrives for neutralization via the valve 19 and the centrifuge 20 as well as the conduit 21 at the neutralization vessel or tank 22 equipped with a stirrer or agitator 23 driven by the stirrer drive motor 24. By means of the conduit 25 there are removed the aqueous-solid centrifuge residues. The devices for washing and drying the residue have not been illustrated but such are conventional.

The base is added by means of the supply container or vessel 26. The apparatus for the pH-measurement and regulation has again only been schematically illustrated by reference character but corresponds to that employed for the reaction vessel 11. Similarly, the pH-measurement instrument 30 is also associated with a control or regulation device 32 for controlling for instance a dosing valve 34, analogous to what was previously explained.

The neutralized brew is delivered via the valve 27 to the centrifuge 28; the liquid arrives at the supply tank 29 from which location, depending upon requirements, it can be removed via the valve 30.

Conventionally employed auxiliary devices such as pumps, dosing valves, timing clocks, electrical connections and so forth have not been particularly illustrated in order to preserve clarity in the drawing, and since the details thereof are not especially considered necessary for understanding the underlying concepts of this development.

The described installation can be operated batchwise or semi-continuously. By carrying out certain modifications it is possible to have a completely continuous operation. The automation of the installation is not associated with any particular requirements and is essentially limited to dosing, switching time control and pH-measurement and regulation.

The method can be considered as being technologically simple insofar as it was possible to build a production installation which provides for an extensively automated proces, with minimum expenditure in personnel.

The method provides reproducible results. Qualitative and quantitative fluctuations in the composition of the final product only result from differences in the starting material.

The method permits of an exact accommodation of the pH-value of the fertilizer to the requirements of the cultures and the culture earth. In this way it is possible to avoid a disadvantageous loading of the buffer capacity.

The product produced according to the method, and which constitutes a diluted solution of hydrolized natural nutrients in a balanced condition, can be commercially used as such and placed on the market in this form. By evaporation it is also possible to produce concentrates which prior to being used are diluted, and dry products, for instance in spray driers, which prior to use must be dissolved in water. Furthermore, it is possible to agglomerate synthetic fertilizers by means of the concentrate or to coat synthetic fertilizer granulates with such concentrate, so that there are formed inorganic- organic mixed fertilizers.

For the purpose of further explaining the invention the following Example is given:

EXAMPLE 1,000 kilograms fresh poultry dung are mixed with 1,000 kilograms water in a closed vessel and intensively agitated with the aid of a stirrer for 6 hours. Gaseous reaction products are withdrawn by an alkaline absorption solution.

After 6 hours the mixture is acidified with concentrated sulfuric acid and at pH of 1 is hydrolized while continuously stirring. Consumed acid is continuously replenished. The gases which are formed are withdrawn by a liquid filter. After 48 hours the solid constituents are sedimentated. The liquid phase is separated from the solid phase by carrying out subsequent centrifuging. The solid residues are composted after washing.

The liquid phase is caught in a closed vessel, agitated and by the addition of calcium hydroxide there is adjusted during a period of 12 hours a pH-value of 6. The formed precipitate is sedimentated and by centrifuging the liquid phase is separated from the solid phase. The solution is then immediately filled into tightly sealable containers.

While there is shown and described present preferred embodiments of the invention, it is to be distinctly understood that the invention is not limited thereto, but may be otherwise variously embodied and practiced within the scope of the following claims. Accordingly,

What is claimed is:

1. A method for the production of a natural fertilizer comprising the steps of:
    1. treating a mixture of animal secretions with a mineral acid until attaining a pH-value in the range of 0.1 to 2 and maintaining such pH-value substantially constant;
    2. agitating the mixture obtained by step (1) for a period in the order of to 60 hours in order to decompose said mixture;
    3. separating the thus obtained liquid phase from undissolved solids;
    4. regulating the pH of the liquid freed of solids obtained during step (3) above by the addition of a basic substance so as to attain a value of at least 5.

2. The method as defined in claim 1, including the step of concentrating the final product into a liquid concentrate.

3. The method as defined in claim 1, including the step of separating any precipitate formed after termination of the neutralization.

4. The method as defined in claim 1, including the step of admixed the animal secretions with water prior to the addition of the mineral acid.

5. The method as defined in claim 4, wherein the mixture of water and animal secretions contains about 70 to 80% by weight of water.

6. The method as defined in claim 1, including the step of using as the animal secretion poultry dung.

7. The method as defined in claim 6, wherein said poultry dung is chicken dung.

8. The method as defined in claim 6, including the step of using the poultry dung in admixture with at least solid secretions of other animals.

9. The method as defined in claim 6, including the step of using the poultry dung in admixture with at least liquid secretions of other animals.

10. The method as defined in claim 4, including the step of agitating the animal secretions during the preparation thereof with water for a period of approximately 2 to 12 hours at atmospheric pressure and temperature, and removing any waste gases produced as a result thereof.

11. The method as defined in claim 10, wherein the agitation step is carried out about between 5 to 6 hours.

12. The method as defined in claim 10, wherein the removal of waste gases occurs by passing the same through an alkaline charged filter.

13. The method as defined in claim 10, including the step of facilitating the removal of the waste gases by introducing a gas.

14. The method as defined in claim 13, wherein the introduced gas is air.

15. The method as defined in claim 4, further including the step of separating coarse foreign bodies from the mixture of animal secretions and water prior to the reaction with the mineral acid.

16. The method as defined in claim 1, including the step of using as the mineral acid a member selected from the group comprising sulfuric acid, nitric acid and phosphoric acid, and utilizing as the basic substance of step (4) a member selected from the group comprising calcium oxide, calcium hydroxide or calcium carbonate.

17. The method as defined in claim 1, including the step of expelling waste gases produced during step (1) through an alkaline charged filter into the atmosphere.

18. The method as defined in claim 17, including the step of facilitating the removal of the waste gases by introducing an inert gas.

19. The method as defined in claim 18, wherein the inert gas is air.

20. The method as defined in claim 1, including the step of sub-dividing the addition of the basic substance of step (4) over a time span of about 12 hours and regulating the pH-value so as to be in the order of 5.8 to 6.2, while agitating the mixture at room temperature and at standard pressure.

21. The method as defined in claim 1, wherein after termination of the addition of the basic substance separating the precipitate which is obtained during step (4).

22. The method as defined in claim 21, wherein separation occurs by centrifuging.

23. The method as defined in claim 4, including the step of regulating the starting solid content of the aqueous phase such that the solid content of the final product amounts to at least 4% by weight.

24. The method as defined in claim 1, including the step of drying the final product.

25. The method as defined in claim 24, including adding mineral fertilizer during the drying step.

* * * * *